(12) United States Patent
Hatta et al.

(10) Patent No.: US 10,792,845 B2
(45) Date of Patent: Oct. 6, 2020

(54) FUEL TANK PRODUCING APPARATUS

(71) Applicants: Ken Hatta, Okazaki (JP); Yasuhiro Sasaki, Osaka (JP)

(72) Inventors: Ken Hatta, Okazaki (JP); Yasuhiro Sasaki, Osaka (JP)

(73) Assignees: TOYOTA JIDOSHA KABUSHIKI KAISHA, Toyota (JP); KOYO THERMO SYSTEMS CO., LTD., Nara (JP)

(*) Notice: Subject to any disclaimer, the term of this patent is extended or adjusted under 35 U.S.C. 154(b) by 335 days.

(21) Appl. No.: 15/969,074

(22) Filed: May 2, 2018

(65) Prior Publication Data

US 2018/0333900 A1 Nov. 22, 2018

(30) Foreign Application Priority Data

May 19, 2017 (JP) .................. 2017-099727

(51) Int. Cl.
| | | |
|---|---|---|
| B29C 35/04 | (2006.01) | |
| F27B 9/10 | (2006.01) | |
| B29C 70/32 | (2006.01) | |
| F27B 9/12 | (2006.01) | |
| B29K 307/04 | (2006.01) | |
| B29L 31/00 | (2006.01) | |
| F27D 9/00 | (2006.01) | |
| B29K 63/00 | (2006.01) | |

(52) U.S. Cl.
CPC ............ B29C 35/045 (2013.01); B29C 70/32 (2013.01); F27B 9/10 (2013.01); *B29K 2063/00* (2013.01); *B29K 2307/04* (2013.01); *B29L 2031/7156* (2013.01); *B29L 2031/7172* (2013.01); *F27B 2009/124* (2013.01); *F27D 2009/007* (2013.01)

(58) Field of Classification Search
CPC ..................................................... B29C 35/045
See application file for complete search history.

(56) References Cited

U.S. PATENT DOCUMENTS 3,282,757 A * 11/1966 Brussee ................. B29C 70/86
156/69
5,078,774 A * 1/1992 Vehmas ................ C03B 27/016
65/114

(Continued)

FOREIGN PATENT DOCUMENTS

| EP | 2 132 510 B1 | 3/2017 |
|---|---|---|
| EP | 1 829 843 B1 | 6/2018 |
| JP | 2005-049072 A | 2/2005 |

*Primary Examiner* — Nathaniel Herzfeld

(57) ABSTRACT

A fuel tank producing apparatus that allows the thickness of a resin on the surface of a tank container to be uniform and that is capable of improving the curing quality of the tank container. The fuel tank producing apparatus includes a conveyor for conveying the tank container, a plurality of heating chambers for heating the tank container during the conveyance, a cooling furnace for cooling the tank container at a position downstream of the plurality of heating chambers in the conveying direction, a gas supplier for supplying gas to the plurality of heating chambers, a plurality of nozzles for blowing the gas supplied from the gas supplier onto the surface of the tank container in the plurality of heating chambers, and a plurality of plug heaters for heating the gas between the gas supplier and the plurality of nozzles.

4 Claims, 9 Drawing Sheets

(56) References Cited

U.S. PATENT DOCUMENTS

| | | | | |
|---|---|---|---|---|
| 5,125,948 A * | 6/1992 | Vanaschen | ............... | C03B 25/08 |
| | | | | 65/162 |
| 5,338,008 A * | 8/1994 | Okuno | .................. | B23K 1/008 |
| | | | | 266/105 |
| 6,131,411 A * | 10/2000 | Schnabel, Jr. | .......... | C03B 29/08 |
| | | | | 219/388 |
| 7,316,080 B1 * | 1/2008 | Woolsey | ................. | F26B 17/04 |
| | | | | 34/207 |
| 7,854,866 B2 * | 12/2010 | Atkinson | ............ | B29C 35/0277 |
| | | | | 264/2.6 |
| 7,975,603 B1 * | 7/2011 | Mikelsons | ........... | A22C 11/008 |
| | | | | 198/430 |
| 8,220,130 B2 * | 7/2012 | Robbins | ................. | B65D 88/06 |
| | | | | 220/560.03 |
| 10,023,322 B2 * | 7/2018 | Keefer | ................. | B65D 39/084 |
| 2008/0213155 A1 | 9/2008 | Kienzle et al. | | |
| 2014/0072710 A1 * | 3/2014 | Valle | .................... | B05D 3/0218 |
| | | | | 427/248.1 |
| 2015/0224720 A1 * | 8/2015 | Hatta | ........................ | F17C 1/06 |
| | | | | 156/172 |

\* cited by examiner

<Temperature profile of heat curing furnace>

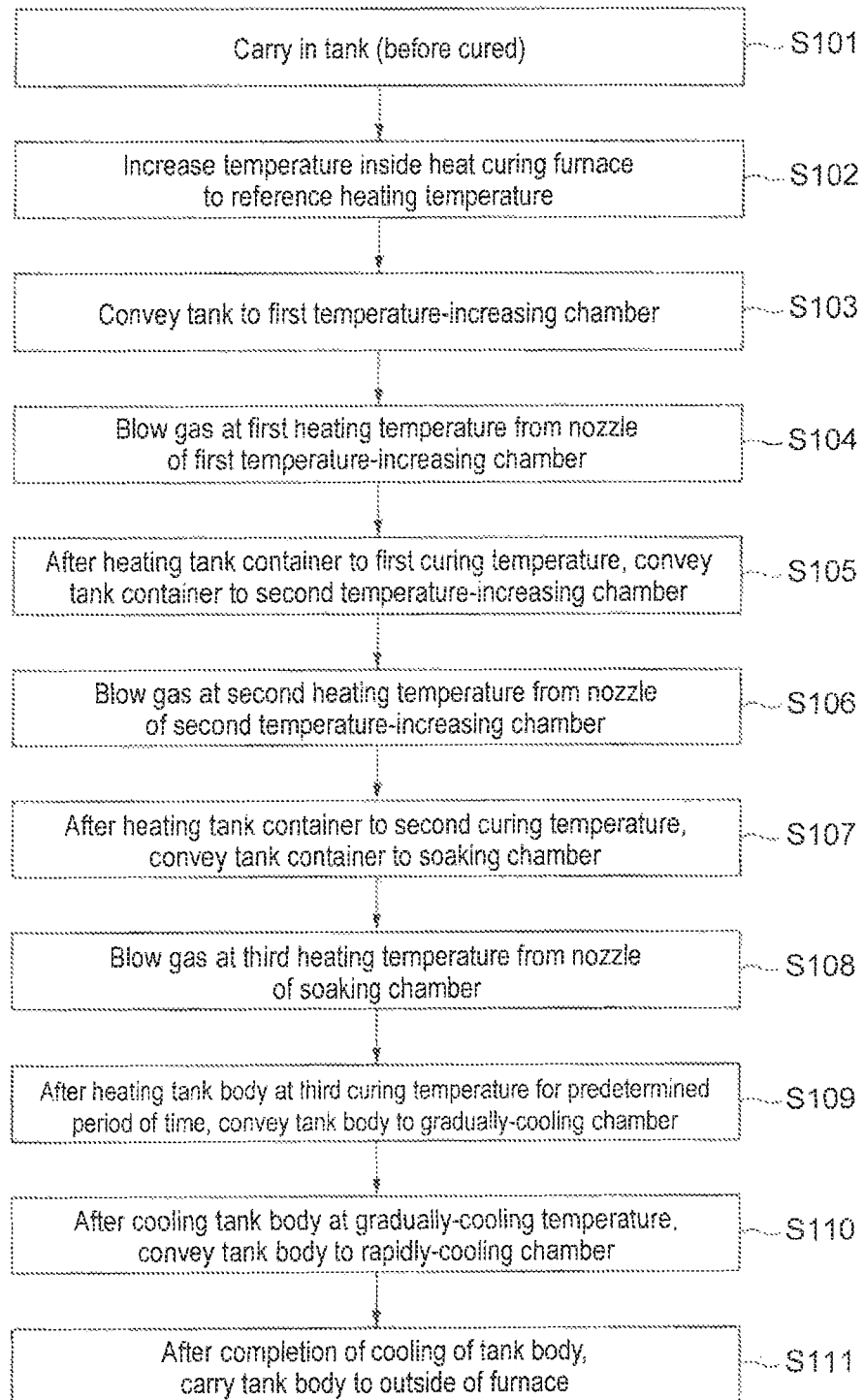

FUEL TANK PRODUCING APPARATUS

CROSS REFERENCE TO RELATED APPLICATIONS

The present application claims priority from Japanese patent application JP 2017-099727 filed on May 19, 2017, the content of which is hereby incorporated by reference into this application.

BACKGROUND

Technical Field

The present disclosure relates to a fuel tank producing apparatus.

Fuel tanks, such as a hydrogen tank, mounted on fuel-cell and hydrogen vehicles and the like are required to have enough strength to resist a high pressure and to be lightweight. As a method for producing such fuel tanks, there is known a method that includes preparing a tank container by repeatedly winding carbon fibers impregnated with a thermosetting resin such as an epoxy resin around the surface of a cylindrical liner while rotating the cylindrical liner and then thermally curing the thermosetting resin (that is, a filament winding method).

For preparing a tank container, it takes a very long time to cure the thermosetting resin and complicated curing reactions take place. Thus, to reliably thermally cure the thermosetting resin, it is necessary to perform temperature control of varying the heating temperature in accordance with the curing time. When a continuous curing furnace having furnace body units connected with each other is used for heating the tank container, the cost and space occupied by an apparatus can be reduced.

JP 2005-49072 A discloses the configuration of a tunnel furnace that includes a means for continuously conveying an object to be heated at positions from an inlet through an outlet of a furnace chamber and that has temperature profile conditions set for the inside of the furnace chamber through variously setting the temperatures of heaters provided at the upper and lower portions inside the furnace chamber.

Background Art

In the continuous curing furnace, it is necessary to perform temperature control of precisely controlling the temperature inside the furnace chamber and varying the heating temperature in accordance with the curing time. If the tunnel furnace of JP 2005-49072 A is applied to fuel tank production, since the temperature of a heating chamber is affected by the temperatures of the neighboring heating chambers, it is difficult to individually precisely control the temperature of each of the heating chambers. Further, for controlling the temperature of each of the heating chambers, open/close doors for differentiating the temperatures of the heating chambers from each other as well as a hot air generator for each chamber are needed. This requires a very high equipment investment and a complicated mechanism. Further, if variations in the temperature occur at the time of opening and closing the doors, the curing quality may become unstable.

The present disclosure has been made in view of such technical problems, and provides a fuel tank producing apparatus capable of simplifying the equipment structure and stabilizing the curing quality.

SUMMARY

According to the present disclosure, there is provided a fuel tank producing apparatus adapted to heat a tank container with fibers impregnated with a thermosetting resin wound around the surface thereof so as to thermally cure the thermosetting resin, the fuel tank producing apparatus including a conveyor for conveying the tank container, a plurality of heating chambers for heating the tank container during the conveyance, a cooling chamber for cooling the tank container at a position downstream of the plurality of heating chambers in the conveying direction of the conveyor, a gas supplier for supplying gas to the plurality of heating chambers, a plurality of nozzles for blowing the gas supplied from the gas supplier onto the surface of the tank container in the plurality of heating chambers, and a plurality of heaters for heating the gas between the gas supplier and the plurality of nozzles.

According to the present disclosure, the gas to be supplied to each nozzle from the gas supplier is heated by each heater to be adjusted to a suitable temperature and is blown from each nozzle onto the surface of the tank container in each heating chamber, so that the tank container can be directly heated to a suitable temperature. Therefore, the temperatures of the heating chambers are less affected by those of the adjacent heating chambers, so that the tank container can be controlled to be heated to a suitable temperature in each heating chamber and the curing quality can be stabilized. Further, it is possible to eliminate the need to provide open/close doors between the adjacent heating chambers, so that the equipment structure can be simplified.

In the fuel tank producing apparatus according to the present disclosure, each heating chamber includes a first temperature-increasing chamber, a second temperature-increasing chamber, and a soaking chamber, which are arranged in this order from the upstream side to the downstream side in the conveying direction of the conveyor, and it is preferable that the temperatures of the gas blown from the nozzles in the second temperature-increasing chamber, soaking chamber, and first temperature-increasing chamber be set to become lower in this order by means of the plurality of heaters.

In the fuel tank producing apparatus according to the present disclosure, each heating chamber preferably includes an intake damper for adjusting the amount of gas to be supplied to each nozzle through changing an opening area of an intake port that communicates with each nozzle, an exhaust damper for adjusting the amount of gas to be discharged from each heating chamber through changing an opening area of an exhaust port opened in each heating chamber, a pressure measuring sensor for measuring the pressure in each heating chamber, and a control device adapted to expand the opening area of the exhaust port by controlling the exhaust damper when the pressure in each heating chamber is positive as compared to a predetermined value, and to expand the opening area of the intake port by controlling the intake damper when the pressure in each heating chamber is negative as compared to the predetermined value.

According to such a configuration, feedback control of adjusting the pressure in each heating chamber can be performed with the use of measurement results of the pressure in each heating chamber. Therefore, the temperature in each heating chamber can be stabilized, so that the curing quality can be stabilized.

In the fuel tank producing apparatus according to the present disclosure, it is preferable that the tank container include a cylindrical body portion and dome portions provided at opposite ends of the body portion, each heating chamber be provided with a rotating portion for rotating the tank container about the central axis thereof, and that each nozzle include a first injection port for blowing gas onto the surface of the body portion and second injection ports for blowing gas onto the surfaces of the dome portions from directions of the tangent to the dome portions.

According to the present disclosure, the tank container is rotated about the central axis thereof by the rotating portion in each heating chamber, and gas is blown from the first injection port onto the surface of the body portion and from the second injection ports onto the surfaces of the dome portions, so that the tank container can be entirely heated and the curing quality of the tank container can be improved.

According to the present disclosure, the equipment structure can be simplified and the curing quality can be stabilized.

BRIEF DESCRIPTION OF THE DRAWINGS

FIG. 9 is a flowchart explaining a production process for a fuel tank.

DETAILED DESCRIPTION

An embodiment of the fuel tank producing apparatus according to the present disclosure will be described below with reference to the drawings.

<Overall Structure>

Figure 1:
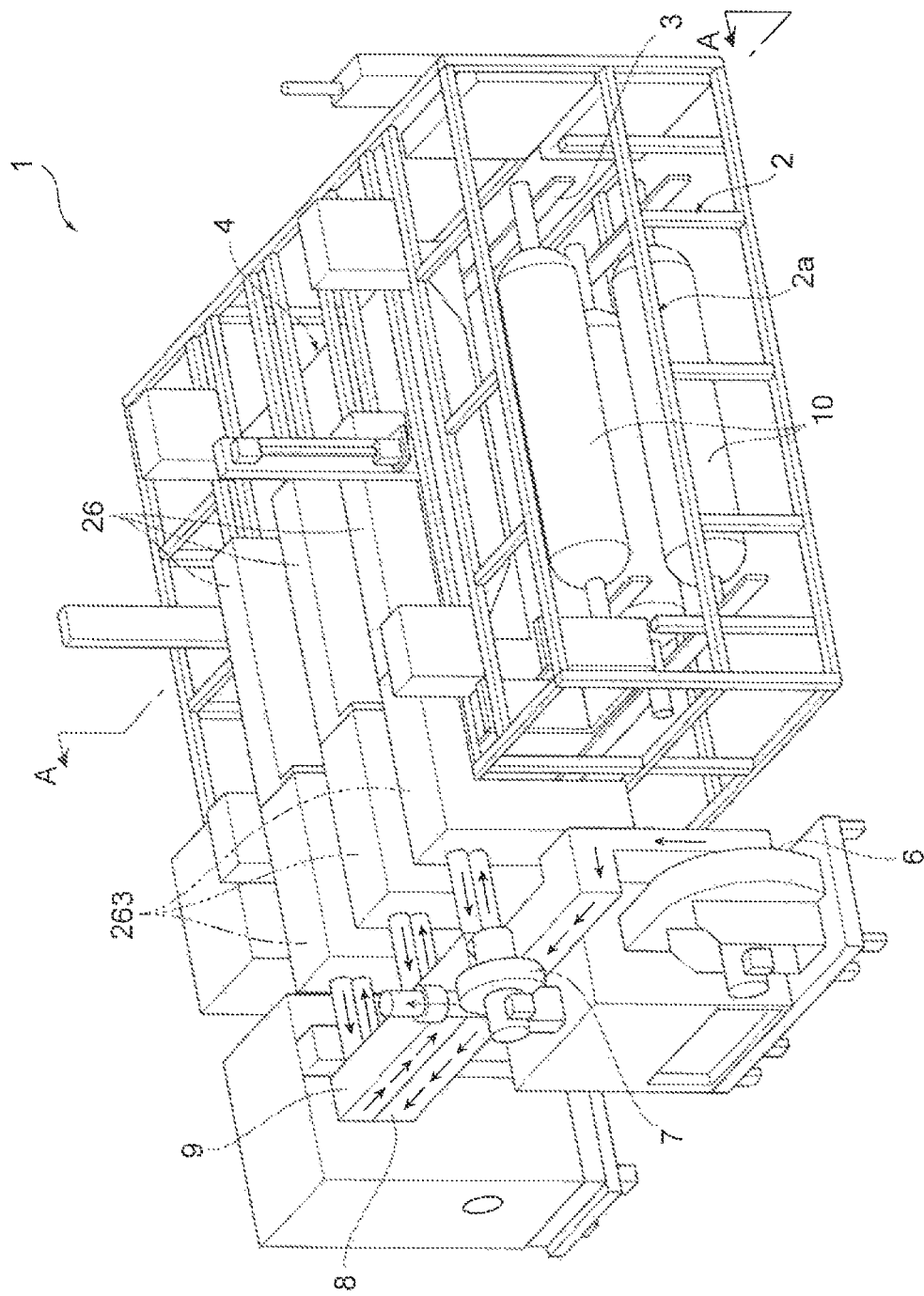
FIG. 1 is a perspective view of a fuel tank producing apparatus according to an embodiment.
Figure 2:
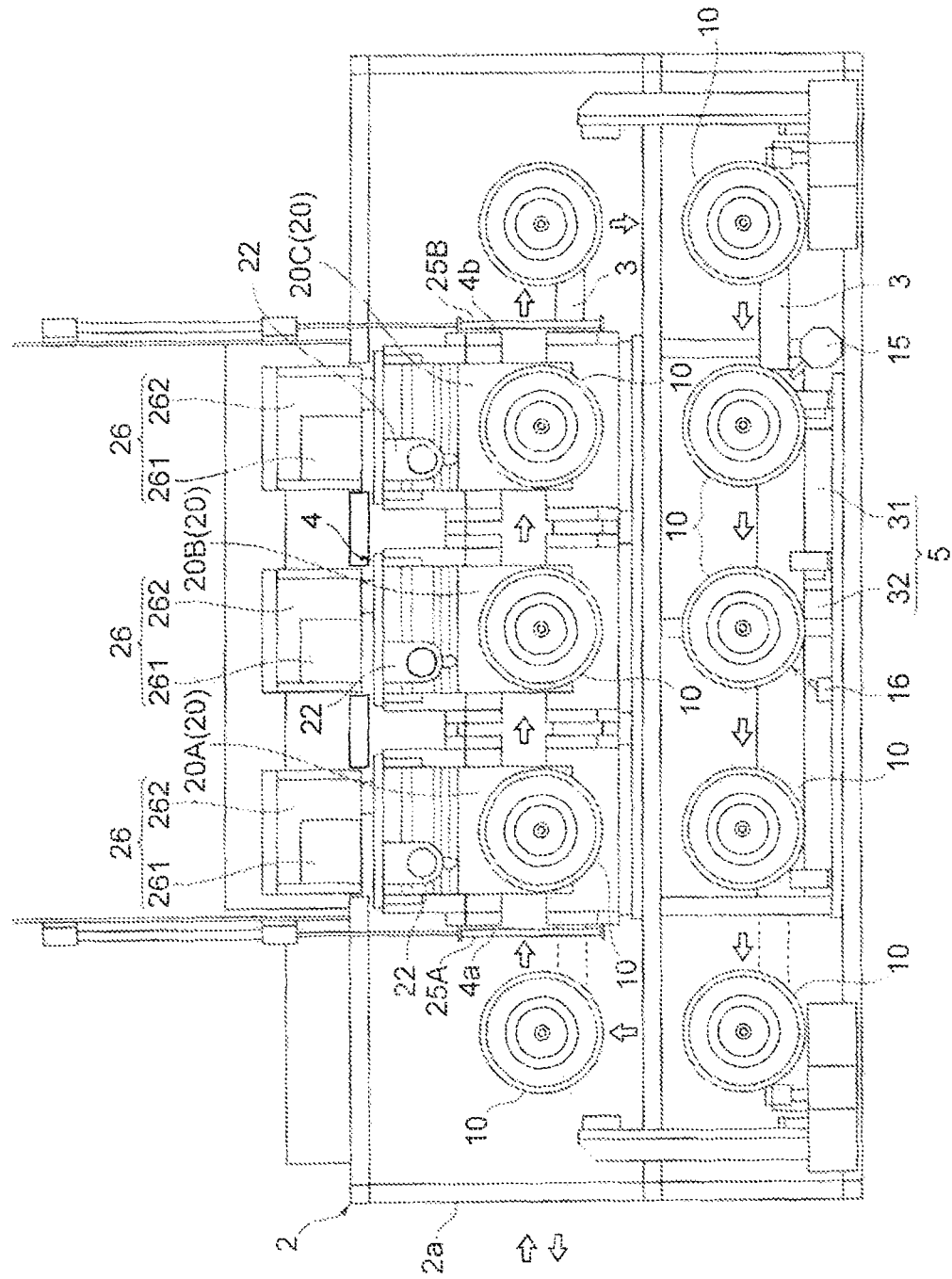
FIG. 2 is a cross-sectional view of the fuel tank producing apparatus taken along line A-A of FIG. 1.

A fuel tank producing apparatus 1 is an apparatus used for producing a fuel tank through heating a tank container 10 with a fiber-reinforced resin layer containing a thermosetting resin so as to thermally cure the fiber-reinforced resin layer. As shown in FIG. 1 and FIG. 2, the fuel tank producing apparatus 1 has a substantially box-shaped housing 2. The housing 2 is assembled from a plurality of frame members that are put together three-dimensionally such that the side and top surfaces of the assembled body are covered with panel members (not shown). The housing 2 has inside thereof a conveyor 3 for conveying the tank container 10, a heat curing furnace 4 for heating the tank container 10 during the conveyance, and a cooling furnace 5 for cooling the tank container 10 at a position downstream of the heat curing furnace 4 in the conveying direction.

The housing 2 is provided, on its front surface, with an opening 2a through which the tank container 10 before thermally cured is carried into the housing 2 and the tank container 10 after thermally cured is carried out of the housing 2. Further, one gas supplier 6 for supplying gas to the heat curing furnace 4 and one gas discharger 7 for discharging gas out of the heat curing furnace 4 are disposed on a lateral side of the housing 2. The gas supplier 6 and the gas discharger 7 are connected to the heat curing furnace 4 by means of an intake duct 8 and an exhaust duct 9, respectively.

The gas supplier 6 is a hot air generator that generates hot air containing, for example, a high-temperature gas of 100° C. The hot air generated in the gas supplier 6 is supplied to the heat curing furnace 4 via the intake duct 8. The intake duct 8 has a built-in plug heater 263, with which the high-temperature gas supplied from the gas supplier 6 to the heat curing furnace 4 can be heated.

As shown in FIG. 2, the housing 2 has a two-tier structure that includes an upper tier with the heat curing furnace 4 disposed therein and a lower tier with the cooling furnace 5 disposed therein. The tank container 10 is supplied to the upper tier of the housing 2 through the opening 2a of the housing 2. The conveyor 3 conveys the tank container 10, which has been supplied to the inside of the housing 2 through the opening 2a, along the upper tier from the end on the front side to the end on the back side of the housing 2, moves down the tank container 10 from the upper tier to the lower tier at the end on the back side, conveys the tank container 10 along the lower tier from the end on the back side to the end on the front side of the housing 2, and moves up the tank container 10 from the lower tier to the upper tier at the end on the front side.

The heat curing furnace 4 has a plurality of heating chambers 20 continuously arranged therein. The plurality of heating chambers 20 are arranged at predetermined intervals in the conveying direction of the conveyor 3 on the upper tier of the housing 2. In the present embodiment, the plurality of heating chambers 20 include three chambers, which are a first temperature-increasing chamber 20A, a second temperature-increasing chamber 20B, and a soaking chamber 20C. The tank container 10 is transferred by means of the conveyor 3 from the first temperature-increasing chamber 20A through the second temperature-increasing chamber 20B to the soaking chamber 20C, and is heated to a predetermined temperature in each of the heating chambers 20. The first temperature-increasing chamber 20A, second temperature-increasing chamber 20B, and soaking chamber 20C are each provided with a nozzle 22 for injecting a high-temperature gas supplied through an intake passage 261 of an intake and exhaust box 26 and directly blowing the gas to the tank container 10, so that the tank container 10 is heated with the hot air blown from the nozzle 22 in each of the heating chambers 20.

Open/close doors 25A and 25B are respectively provided at an end of the first temperature-increasing chamber 20A on the upstream side in the conveying direction and at an end of the soaking chamber 20C on the downstream side in the conveying direction. The open/close doors 25A and 25B are adapted to open and close an inlet 4a and an outlet 4b of the heat curing furnace 4, respectively, and are moved up and down by an actuator. When heating is performed, the doors are moved down so as to close the inlet 4a and outlet 4b, and when the tank container 10 is carried into and out of the heat curing furnace 4, the doors are moved up so as to open the inlet 4a and outlet 4b. Therefore, while heating is performed, the heat curing furnace 4 is hermetically sealed, so that the temperature inside the furnace can be stabilized.

The first temperature-increasing chamber 20A, second temperature-increasing chamber 20B, and soaking chamber 20C each have the intake and exhaust box 26 attached to an upper portion thereof, the intake and exhaust box 26 being integrally formed with the heat curing furnace 4. The plurality of intake and exhaust boxes 26 each have the intake passage 261 that allows the intake duct 8 to communicate with each of the first temperature-increasing chamber 20A, second temperature-increasing chamber 20B, and soaking chamber 20C, and an exhaust passage 262 that allows the exhaust duct 9 to communicate with each of the first temperature-increasing chamber 20A, second temperature-increasing chamber 20B, and soaking chamber 20C. The intake and exhaust boxes 26 each have the built-in plug heater 263, with which the gas supplied through the intake duct 8 to the first temperature-increasing chamber 20A, second temperature-increasing chamber 20B, and soaking chamber 20C can be individually heated so as to be adjusted to a predetermined heating temperature.

The cooling furnace 5 includes a gradually-cooling chamber 31 for decreasing the temperature of the tank container 10 at a relatively low speed, and a rapidly-cooling chamber 32 for decreasing the temperature of the tank container 10 at a relatively high speed. The gradually-cooling chamber 31 and the rapidly-cooling chamber 32 are sequentially arranged at a predetermined interval in the conveying direction. The gradually-cooling chamber 31 is provided with a nozzle 15 for blowing hot air or room-temperature air onto the tank container 10, and the rapidly-cooling chamber 32 is provided with a nozzle 16 for blowing a refrigerant onto the tank container 10.

The fuel tank producing apparatus 1 is provided with a control device for controlling the components thereof. The control device includes an electronic circuit or a computer, with which control of the conveyance of the tank container 10, feedback control of the temperature and pressure of each of the heating chambers 20, and the like are performed.

<Configuration of Heating Chamber>

Figure 3:
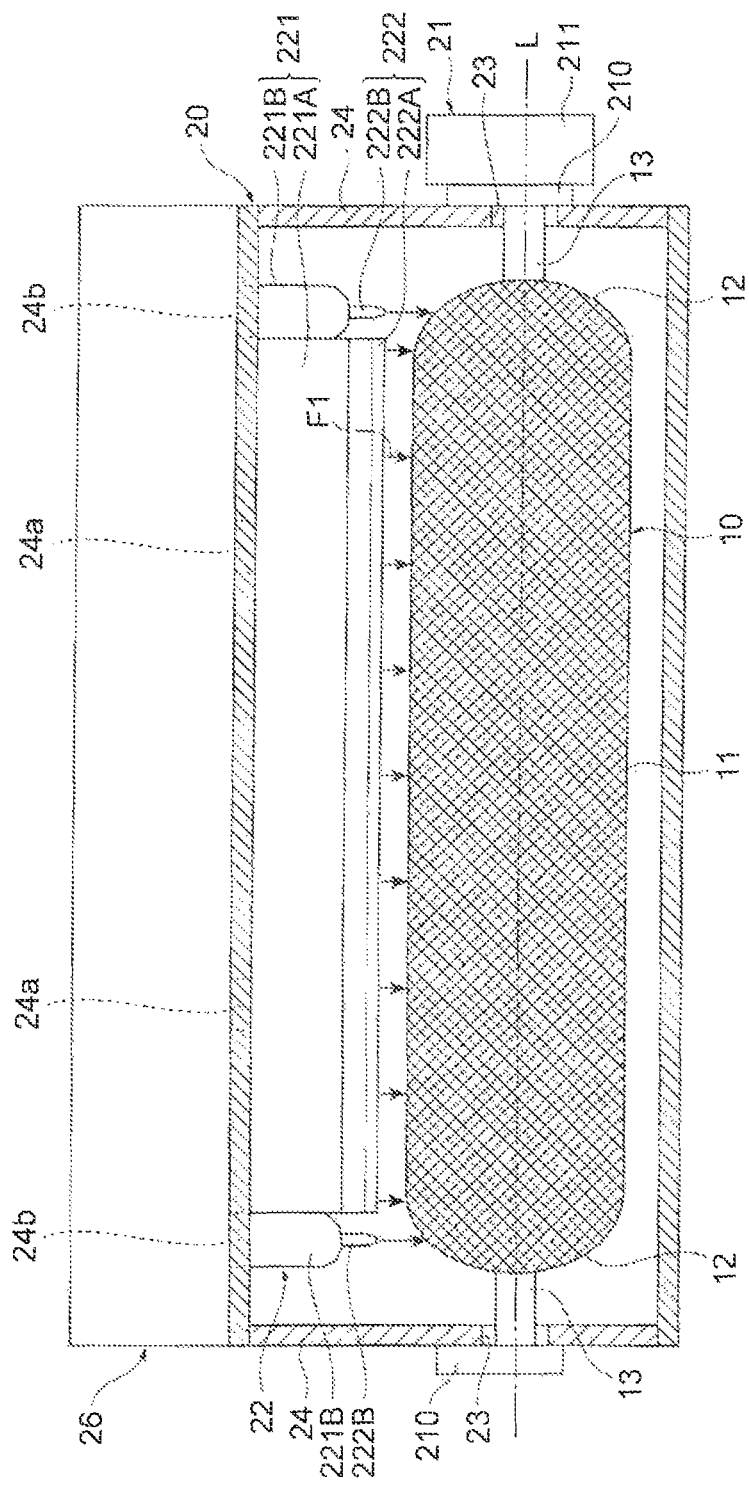
FIG. 3 is a front view of the internal structure of a heat curing furnace.

Herein, the structure of the tank container 10 is first described. As shown in FIG. 3, the tank container 10 is a hollow container that has a cylindrical body portion 11 with a substantially uniform radius and convex-curved dome portions 12 provided at opposite ends of the body portion 11. A supported shaft 13 is detachably attached to each of the opposite ends (left and right opposite ends in FIG. 3) in the central axis L direction of the tank container 10. The tank container 10 is conveyed so as to move in a direction orthogonal to the central axis L while being supported at the supported shafts 13 at its opposite ends by the conveyor 3. Further, in the heat curing furnace 4 and cooling furnace 5, the tank container 10 is rotated about the central axis L thereof with the rotary drive of a rotating motor 211 while being rotatably supported, via the supported shafts 13, by bearing members 210 of a rotating device 21 that will be described later.

Furthermore, the tank container 10 includes a liner (not shown) that has a storage space for storing fuel therein and a fiber-reinforced resin layer tightly attached to the outer wall of the liner. The liner is made of, for example, a resin material or a light metal material, such as aluminum. Meanwhile, the fiber-reinforced resin layer is a reinforcing layer that covers the outer surface of the liner and is made of reinforcing fibers of a carbon fiber reinforced plastic (CFRP) and the like and a thermosetting resin such as epoxy with which the reinforcing fibers are impregnated, which are wound around the outer surface of the liner.

Figure 4:
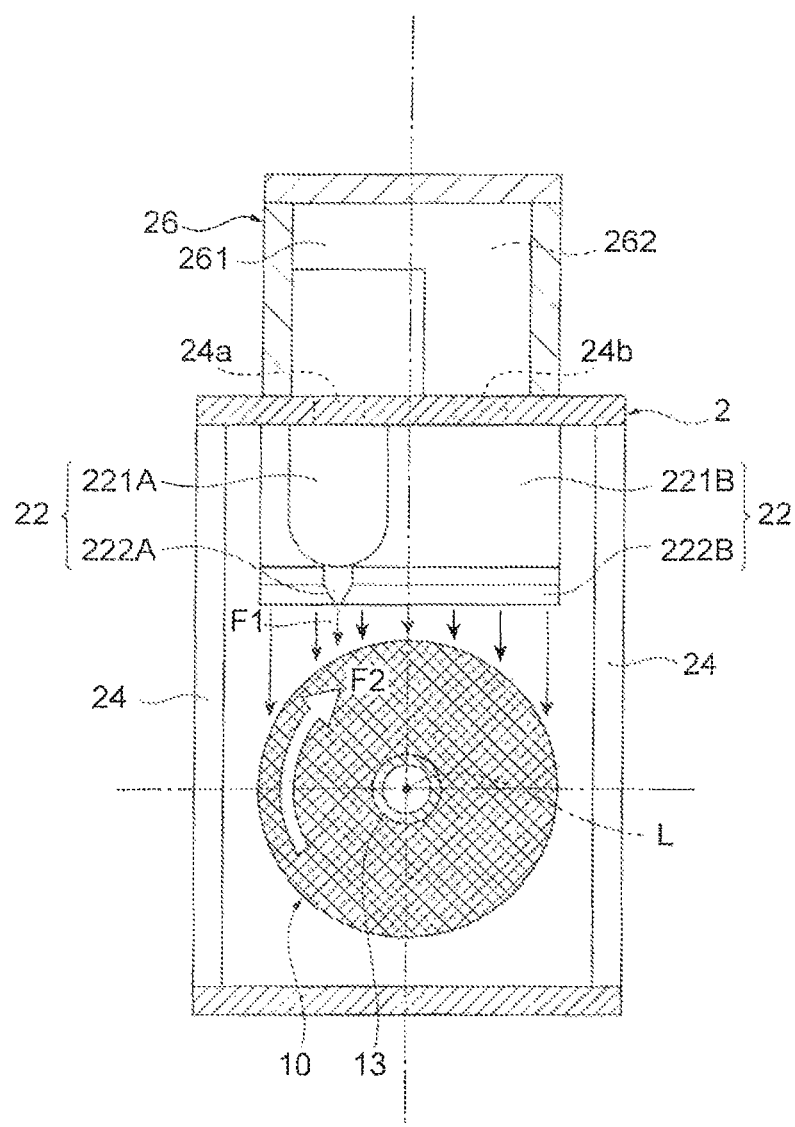
FIG. 4 is a side view of the internal structure of the heat curing furnace.

As shown in FIG. 3 and FIG. 4, each of the plurality of heating chambers 20 of the heat curing furnace 4 is provided with a space for accommodating the tank container 10 therein and is generally substantially in a box shape. It should be noted that in FIG. 3, for easy understanding of the internal structure, furnace walls 24 on the front and back sides of the heating chamber 20 are omitted.

Each heating chamber 20 is formed, for example, such that the furnace walls 24 with heat-insulating and heat-retaining properties are attached to a metal frame body. The furnace walls 24 on the front and back sides of the heating chamber 20 are each provided with an opening through which the tank container 10 conveyed by means of the conveyor 3 is passed. The heating chamber 20 is connected to the adjacent heating chambers 20 with their openings communicating with each other. Further, among the first temperature-increasing chamber 20A, second temperature-increasing chamber 20B, and soaking chamber 20C, the opening at the end of the first temperature-increasing chamber 20A on the upstream side in the conveying direction forms an inlet of the heat curing furnace 4 and the opening at the end of the soaking chamber 20C on the downstream side in the conveying direction forms an outlet of the heat curing furnace 4.

Each heating chamber 20 of the heat curing furnace 4 is provided with the rotating device 21 for rotating the tank container 10 about the central axis thereof. As shown in FIG. 3, the rotating device 21 is configured to include a pair of bearing members 210 that are fixed to the outer sides of the furnace walls 24 of the heat curing furnace 4 and that support the aforementioned supported shafts 13, and the rotating motor 211 disposed on one side of the pair of bearing members 210. With the rotating device 21 disposed outside of the heating chamber 20, the internal space of the heat curing furnace 4 can be reduced, so that the overall size of the heating chamber 20 can be reduced. In addition, as compared to the heat curing furnace 4 with the rotating device 21 disposed therein, no heat is absorbed by the rotating device 21. Therefore, energy saving can also be achieved.

<Configuration of Furnace Wall>

Figure 5:
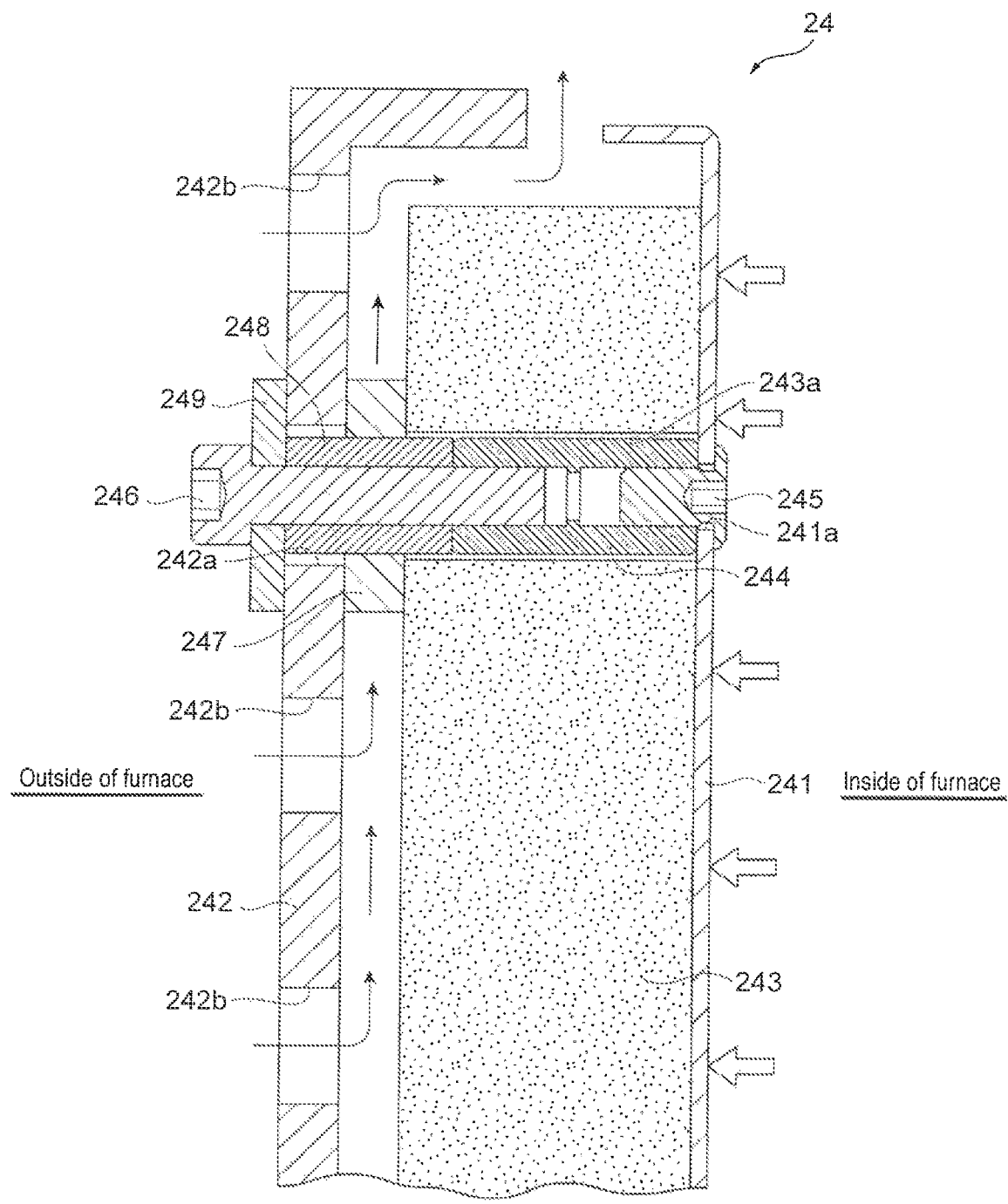
FIG. 5 is an enlarged cross-sectional view of the main part of a furnace wall.

Since the inside of the heat curing furnace 4 is subjected to a high temperature, a highly heat-insulating furnace wall is required. As the furnace wall is made thicker, the heat-insulating property is enhanced, but there is a problem in that the equipment is enlarged as the furnace wall is made thicker. The furnace wall 24 of the heat curing furnace 4 is thin and has a highly heat-insulating property. Specifically, as an enlarged cross section of the main part of the furnace wall is shown in FIG. 5, the furnace wall 24 has such a structure that a thin heat-insulating material 243 with a highly efficient heat-insulating property is interposed between a furnace inner wall 241 and a furnace outer wall 242, so that a gap for forming an air layer is provided between the furnace outer wall 242 and the heat-insulating material 243. Further, the furnace wall 24 has such a structure that in order to block the heat conduction from the furnace inner wall 241 to the furnace outer wall 242 via a fastening component for securely fastening the furnace inner wall 241 to the heat-insulating material 243, the furnace outer wall 242 is secured to the heat-insulating material 243 with a heat-insulating fastening component.

The furnace wall 24 includes the furnace inner wall 241 made of a SUS plate, the furnace outer wall 242 made of a polycarbonate plate, and the heat-insulating material 243 with a highly efficient heat-insulating property disposed therebetween, for example. The heat-insulating material 243 is provided with a through-hole 243a, and a nut 244 is mounted inside the through-hole 243a. The furnace inner wall 241 and the furnace outer wall 242 are provided with bolt insertion holes 241a and 242a, respectively, at positions corresponding to the nut 244, and bolts 245 and 246 are inserted into the bolt insertion holes 241a and 242a from the opposite sides of the nut 244 in the axial direction so as to be screwed to and fastened to the nut 244.

The gap for forming the air layer is provided between the furnace outer wall 242 and the heat-insulating material 243. The gap is formed such that a heat-insulating spacer 247 made of, for example, a heat-insulating resin material is interposed between the outer furnace wall 242 and the heat-insulating material 243. The heat-insulating spacer 247 and the air layer suppress the heat conduction from the heat-insulating material 243 to the outer furnace wall 242, so that the heat-insulating property of the furnace wall 24 can be improved. Further, the furnace outer wall 242 is provided with air circulation slits 242b. As indicated by arrows in FIG. 5, an air flow (indicated by thin arrows in the drawing) is formed as air is taken into the gap between the furnace outer wall 242 and the heat-insulating material 243 through the slits 242b and discharged from an end of the furnace outer wall 242 through the tunnel effect. Thus, the heat conduction from the heat-insulating material 243 to the outer furnace wall 242 is further suppressed, so that the heat-insulating property of the furnace wall 24 can be drastically improved.

Further, a heat-insulating collar 248 is interposed between the nut 244 and the bolt 246 for fastening the furnace outer wall 242 to the nut 244, and a heat-insulating washer 249 is interposed between the bolt head of the bolt 246 and the furnace outer wall 242. The heat-insulating collar 248 and heat-insulating washer 249 are each made of, for example, a highly heat-insulating resin material, and block the thermal energy (indicated by thick arrows in the drawing) transmitted from the inside of the furnace via the bolt 245 and nut 244, so that the transmission of the thermal energy to the furnace outer wall 242 can be prevented. As described above, since the furnace wall 24 of the present embodiment has a highly heat-insulating structure, the heat-insulating material 243 can be made thinner than conventional ones. Therefore, the equipment structure can be downsized and simplified.

<Configuration of Nozzle>

As shown in FIG. 3, the nozzle 22 is provided on the ceiling of the heating chamber 20, and includes a rectifying chamber 221 and an injection port 222 that is provided below and integrally formed with the rectifying chamber 221 and that is adapted to blow hot air onto the surface of the body portion 11. The rectifying chamber 221 includes a flat box-shaped first rectifying chamber 221A extending in the central axis L direction of the tank container 10 and a pair of flat box-shaped second rectifying chambers 221B extending in parallel with each other that are formed through bending the opposite ends of the first rectifying chamber 221A.

Figure 6:
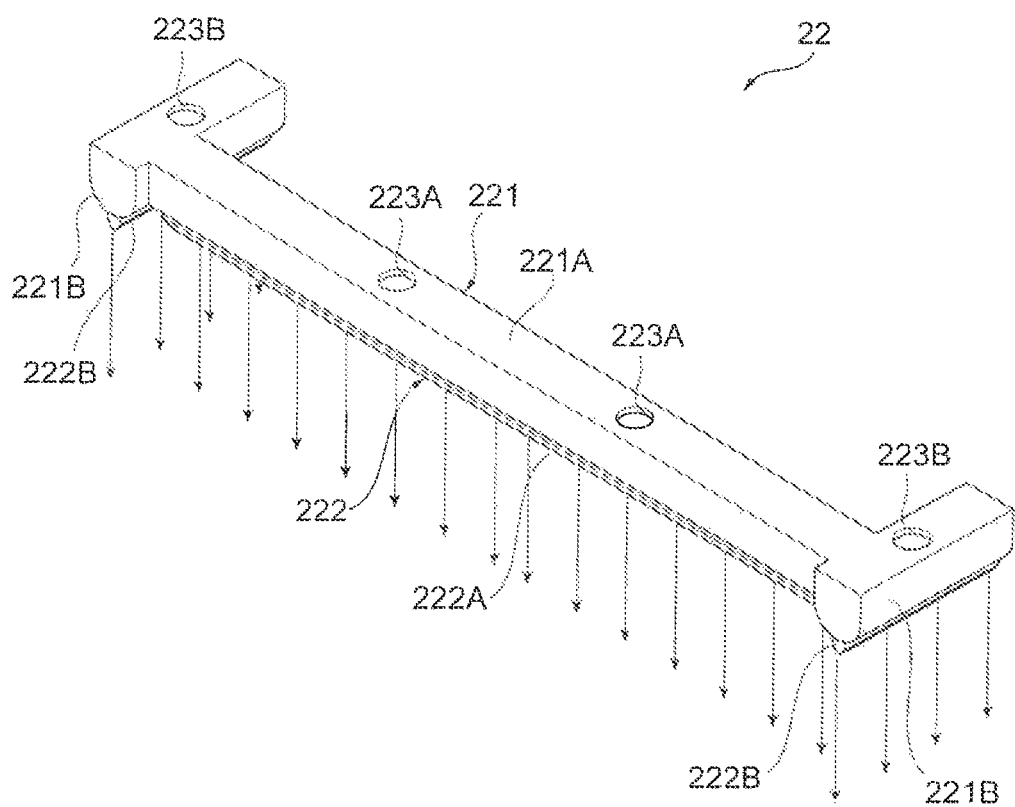
FIG. 6 is a perspective view of a nozzle.

Further, as shown in FIG. 6, a plurality of communicating holes 223A and 223B are provided in the upper surfaces of the first rectifying chamber 221A and second rectifying chambers 221B, the plurality of communicating holes 223A and 223B communicating with the intake passage 261 of the intake and exhaust box 26 via through-holes 24a and 24b of the furnace wall 24, with the rectifying chambers attached to the ceiling of the heating chamber 20. The first rectifying chamber 221A and second rectifying chambers 221B rectify hot air flowing in through the communicating holes 223A and 223B and then supply the hot air to the injection port 222.

The injection port 222 includes a first injection port 222A that is provided below the first rectifying chamber 221A and that is adapted to blow the hot air rectified in the first rectifying chamber 221A onto the surface of the body portion 11, and second injection ports 222B that are provided below the second rectifying chambers 221B and that are adapted to blow the hot air rectified in the second rectifying chambers 221B onto the surfaces of the dome portions 12.

The first injection port 222A and second injection ports 222B are each in a slit shape. The first injection port 222A extends along the longitudinal direction of the first rectifying chamber 221A, and each of the second injection ports 222B extends along the longitudinal direction of each of the second rectifying chambers 221B. The first injection port 222A is disposed along the shape of the body portion 11 of the tank container 10 so as to correspond to the body portion 11, and is adapted to blow hot air onto the surface of the body portion 11. The second injection ports 222B are each disposed along the shape of each of the dome portions 12 of the tank container 10 so as to correspond to each of the dome portions 12, and are each adapted to blow hot air onto the surface of each of the dome portions 12 from the direction of the tangent to each of the dome portions 12. With the use of the first injection port 222A and second injection ports 222B, the surfaces of the body portion 11 and dome portions 12 can be heated evenly.

It is preferable that the first injection port 222A and second injection ports 222B be configured to be movable in the vertical direction (that is, the vertical direction to the central axis L of the tank container 10), in the horizontal direction (that is, the central axis L direction of the tank container 10), and in the front-back direction, relative to the tank container 10, and it is further preferable that the injection angles be configured to be variable. Such a configuration can flexibly correspond to variations in the shape of the tank container 10.

In the present embodiment, the first injection port 222A is located at a position displaced relative to the vertical direction to the central axis L of the tank container 10 as viewed from the central axis L direction of the tank container 10. Specifically, as shown in FIG. 4, the first injection port 222A is located at a position displaced to the left side relative to the vertical direction to the central axis L of the tank container 10. In other words, the first injection port 222A is eccentrically positioned to the left side relative to the center of the tank container 10. Herein, the first injection port 222A may be located at a position displaced to the left side relative to the vertical direction to the central axis L by the same distance as the radius of the body portion 11 so as to blow hot air from the direction of the tangent to the body portion 11 of the tank container 10.

Further, in the present embodiment, the rotating device 21 is configured to rotate the tank container 10 in the reverse direction of the direction in which hot air is blown from the first injection port 222A. Specifically, as shown in FIG. 4, since the first injection port 222A is located at a position displaced to the left side relative to the vertical direction to the central axis L of the tank container 10, hot air blown from the first injection port 222A flows counterclockwise (see an arrow F1) along the surface of the tank container 10. Meanwhile, the tank container 10 is rotated clockwise (see an outline arrow F2) by the rotating device 21.

<Configuration of Intake and Exhaust Box>

The intake and exhaust box 26 is provided corresponding to each of the first temperature-increasing chamber 20A, second temperature-increasing chamber 20B, and soaking chamber 20C. Further, the intake and exhaust box 26 has a structure in which the intake passage 261 and exhaust passage 262 are integrally formed. Conventionally, the intake duct and exhaust duct are individually connected to the heat curing furnace for warm air circulation, for example, but such a structure occupies a large space and requires longer ducts. This causes the intake/exhaust resistance to be increased and leads to an energy loss due to heat radiation. To the contrary, since the intake and exhaust box 26 has the structure in which the intake passage 261 and exhaust passage 262 are integrally formed, space saving and simplified components are realized, and short ducts can be used so that the intake/exhaust resistance is reduced, and an energy loss due to heat radiation is also reduced.

The intake and exhaust box 26 has the built-in plug heater 263 (see FIG. 1), with which gas to be supplied through the intake passage 261 to the first temperature-increasing chamber 20A, second temperature-increasing chamber 20B, or soaking chamber 20C is individually heated and adjusted to a heating temperature predetermined for each of the chambers. The nozzle 22 of each of the first temperature-increasing chamber 20A, second temperature-increasing chamber 20B, and soaking chamber 20C is provided with a temperature sensor for detecting the temperature of the hot air blown, and based on a detection signal from the temperature sensor, feedback control of controlling the degree of heating by the plug heater 263 is performed.

Figure 7:
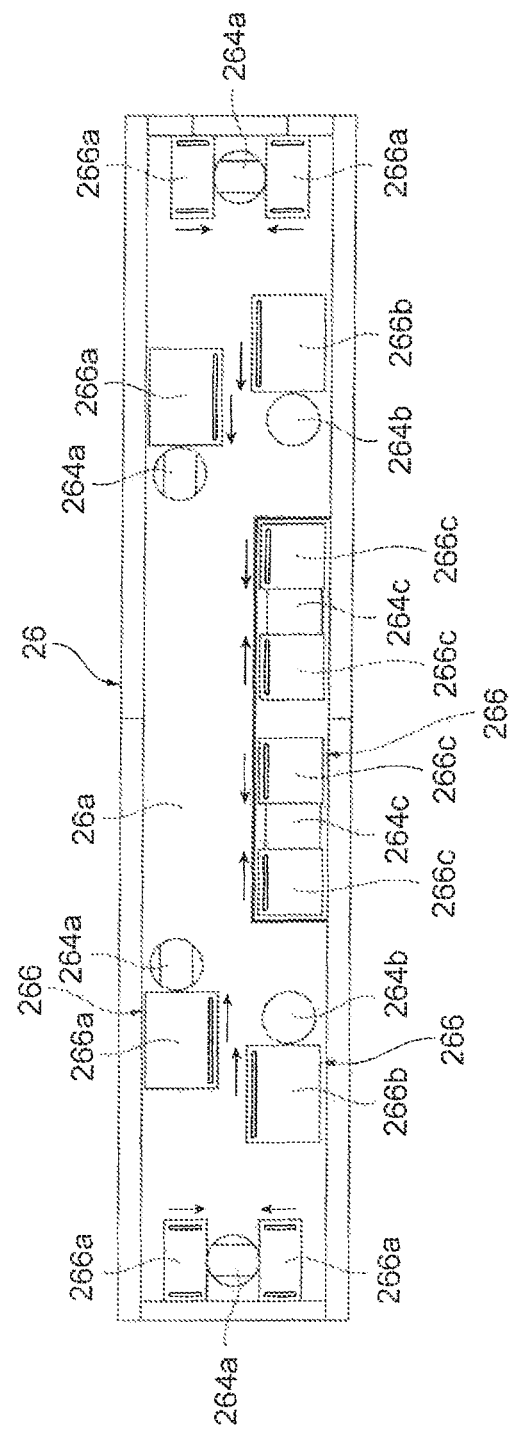
FIG. 7 is a cross-sectional view of a bottom surface of an intake and exhaust box.

As shown in FIG. 7, the intake and exhaust box 26 is provided, on its bottom surface 26a, with intake ports 264a and 264b, and an exhaust port 264c. The intake port 264a is opened at a position where the intake passage 261 of the intake and exhaust box 26 communicates with the rectifying chamber 221 of the nozzle 22 via the through-hole 24a that passes through the ceiling of the heating chamber 20 and the communicating hole 223A of the first rectifying chamber 221A, and the intake port 264b is opened at a position where the intake passage 261 of the intake and exhaust box 26 communicates with the heating chamber 20 via the through-hole 24b (see FIG. 3) that passes through the ceiling of the heating chamber 20 and the communicating hole 223B of the second rectifying chamber 221B. Further, the exhaust port 264c is opened at a position where the exhaust passage 262 of the intake and exhaust box 26 communicates with the inside of the heat curing furnace 4 via the through-hole 24c that passes through the ceiling of the heating chamber 20. Therefore, hot air can be supplied to the rectifying chamber 221 of the nozzle 22 from the intake passage 261 of the intake and exhaust box 26 through the intake ports 264, and the gas in the heating chamber 20 can be discharged to the exhaust passage 262 of the intake and exhaust box 26 through the exhaust port 264c.

The intake and exhaust box 26 is provided with an air amount adjusting damper 266 therein. The air amount adjusting damper 266 includes an open/close first intake damper 266a for adjusting the amount of gas to be supplied to the nozzle 22 through changing the opening area of the intake port 264a that communicates with the rectifying chamber 221, an open/close second intake damper 266b for adjusting the amount of gas to be directly supplied to the heating chamber 20 through changing the opening area of the intake port 264b that communicates with the heating chamber 20, and an open/close exhaust damper 266c for adjusting the amount of gas to be discharged from the heating chamber 20 of the heat curing furnace 4 through changing the opening area of the exhaust port 264c that communicates with the inside of the heat curing furnace 4.

The air amount adjusting damper 266 has a shutter structure in which a shutter slides along the bottom surface 26a of the intake and exhaust box 26, for example, so as to individually open and close the intake ports 264a and 264b and the exhaust port 264c, and the opening and closing are controlled by a control device. The control device performs feedback control of the pressure inside the furnace based on a signal from a pressure measuring sensor for measuring the pressure inside the heat curing furnace 4. The control device is adapted to expand the opening area of the exhaust port 264c by controlling the exhaust damper 266c when the pressure inside the heat curing furnace 4 is positive as compared to a predetermined value, and to expand the opening areas of the intake ports 264a and 264b by controlling the intake dampers 266a and 266b when the pressure inside the heat curing furnace 4 is negative as compared to the predetermined value. Therefore, the intake-exhaust balance of hot air is adjusted so as to stabilize the temperature inside the furnace, so that the curing quality of the tank container 10 can be stabilized.

<Configuration of Cooling Furnace>

The gradually-cooling chamber 31 and rapidly-cooling chamber 32 of the cooling furnace 5 are each provided with a rotating device similar to that of the heating chamber 20 of the heat curing furnace 4, and the tank container 10 conveyed by means of the conveyor 3 is rotated about the central axis thereof. The nozzle 15 is adapted to blow hot air containing a high-temperature gas or room-temperature air onto the surface of the tank container 10 that is rotated by the rotating device in the gradually-cooling chamber 31. The hot air blown from the nozzle 15 is hot air containing a high-temperature gas at a reference gas temperature generated in the gas supplier 6, for example, and has a temperature lower than that of the high-temperature gas blown from the nozzle 22 in the heat curing furnace 4. Therefore, in the gradually-cooling chamber 31, the temperature of the tank container 10 conveyed from the heat curing furnace 4 can be gradually decreased. The nozzle 15 may be adapted to blow room-temperature air instead of hot air. Since the room-temperature air also has a temperature lower than that of the high-temperature gas blown from the nozzle 22 in the heat curing furnace 4, in the gradually-cooling chamber 31, the temperature of the tank container 10 conveyed from the heat curing furnace 4 can be gradually decreased.

The nozzle 16 of the rapidly-cooling chamber 32 is adapted to blow a low-temperature refrigerant onto the surface of the tank container 10 rotated by the rotating device in the rapidly-cooling chamber 32. The refrigerant blown from the nozzle 16 is, for example, room-temperature air and liquid, and has a temperature lower than that of the high-temperature gas blown from the nozzle 15 in the gradually-cooling chamber 31. Therefore, in the rapidly-cooling chamber 32, the temperature of the tank container 10 conveyed from the gradually-cooling chamber 31 can be rapidly decreased.

<Production Process for Fuel Tank>

Figure 8:
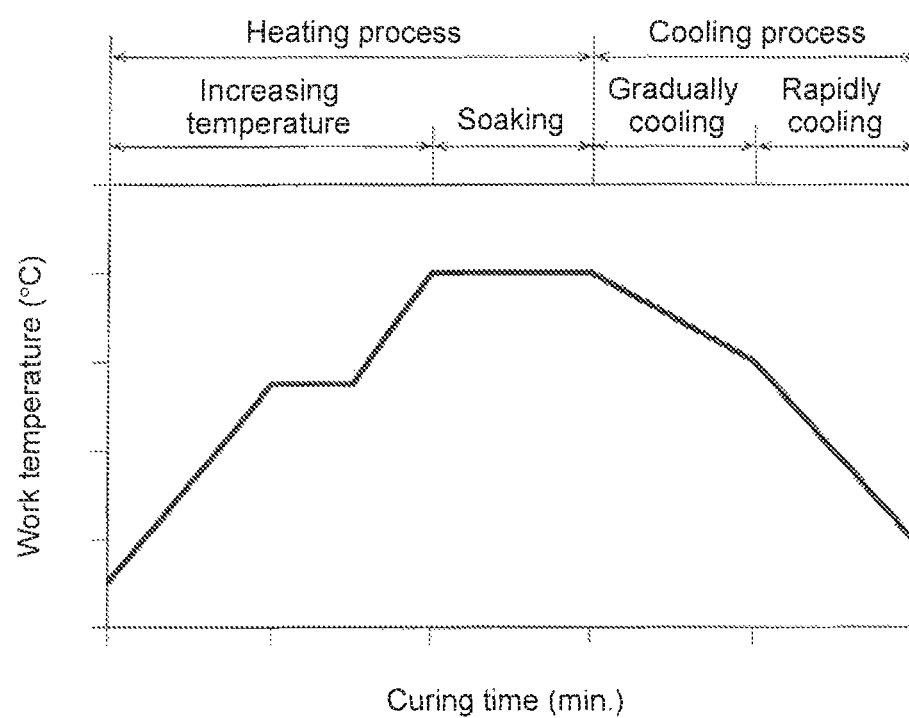
FIG. 8 is a graph showing an example of a temperature profile of the heat curing furnace.

Next, the production process for a fuel tank using the fuel tank producing apparatus 1 with the aforementioned configuration will be described. FIG. 8 is a graph showing an example of a temperature profile of the heat curing furnace, and FIG. 9 is a flowchart explaining a production process for a fuel tank. It should be noted that the operation of the fuel tank producing apparatus 1 described below is performed through control by the control device (now shown).

In the production process for a fuel tank using the fuel tank producing apparatus 1, the tank container 10 is heated and cooled at temperature and timing in accordance with each of the complicated curing reactions of the thermosetting resin. As shown in FIG. 8, the production process for a fuel tank includes a heating process and a cooling process. The heating process is performed in the heat curing furnace 4 on the upper tier of the housing 2 and the cooling process is performed in the cooling furnace 5 on the lower tier of the housing 2.

The heating process includes a temperature-increasing process of increasing the temperature at a predetermined speed and a soaking process of maintaining a constant temperature for a predetermined period of time, and the cooling process includes a gradually-cooling process of decreasing the temperature at a predetermined speed and a rapidly-cooling process of decreasing the temperature at a higher speed than that in the gradually-cooling process. In the present embodiment, in the temperature-increasing process, the temperature is increased step-by-step. If the heating temperature is rapidly increased in the temperature-increasing process in order to improve the productivity, for example, the thermosetting resin may become fragile, thereby making it difficult for the fuel tank to exhibit its expected performance in some cases. Therefore, in the present embodiment, in order to satisfy the heating conditions corresponding to the curing reactions of the thermosetting resin, the temperature is increased step-by-step in the temperature-increasing process, so that the thermosetting resin is prevented from becoming fragile and the fuel tank can exhibit its expected performance.

As shown in FIG. 9, in the production process for a fuel tank, the tank container 10 before being cured including a thermosetting resin uncured is first carried into the housing 2 through the opening 2a of the housing 2 (S101). Then, hot air at a reference gas temperature is generated in the gas supplier 6 and supplied to the heat curing furnace 4 so as to increase the temperature inside the heat curing furnace 4 to the reference gas temperature (S102). Further, the tank container 10 is conveyed to the first temperature-increasing chamber 20A of the heat curing furnace 4 (S103). The open/close door 25A is opened when the tank container 10 is conveyed to the inside of the heat curing furnace 4, and closed when the tank container 10 is placed in the first temperature-increasing chamber 20A. Therefore, a decrease in the temperature inside the heat curing furnace 4 is suppressed, so that the temperature inside the furnace can be stabilized.

The tank container 10 is conveyed to the first temperature-increasing chamber 20A, and is then rotated about the central axis thereof by the rotating device 21 in the first temperature-increasing chamber 20A. Then, a high-temperature gas flowing through the intake passage 261 of the intake and exhaust box 26 is heated by the plug heater 263 of the intake and exhaust box 26 attached to the first temperature-increasing chamber 20A, and the gas heated to a first gas temperature higher than the reference gas temperature is then blown onto the surface of the tank container 10 from the nozzle 22 of the first temperature-increasing chamber 20A (S104). Since the tank container 10 is rotated about the central axis thereof by the rotating device 21, hot air containing the gas at the first gas temperature is blown onto the entire surface of the tank container 10 from the nozzle 22 of the first temperature-increasing chamber 20A, so that the tank container 10 is entirely and uniformly heated.

The temperature of the tank container 10 is increased at a predetermined speed with the hot air blown from the nozzle 22 of the first temperature-increasing chamber 20A, so that the tank container 10 is heated to a first work temperature, and the temperature of the tank container 10 is then maintained at the first work temperature for a predetermined period of time (see FIG. 8). Then, in order to increase the temperature from the first work temperature step-by-step, the tank container 10 is conveyed from the first temperature-increasing chamber 20A to the second temperature-increasing chamber 20B (S105).

The tank container 10 is rotated about the central axis thereof by the rotating device 21 in the second temperature-increasing chamber 20B. Then, the high-temperature gas flowing through the intake passage 261 of the intake and exhaust box 26 is heated by the plug heater 263 of the intake and exhaust box 26 attached to the second temperature-increasing chamber 20B, and the gas heated to a second gas temperature higher than the first gas temperature is then blown onto the surface of the tank container 10 from the nozzle 22 of the second temperature-increasing chamber 20B (S106). Since the tank container 10 is rotated about the central axis thereof by the rotating device 21, hot air containing the gas at the second gas temperature is blown onto the entire surface of the tank container 10 from the nozzle 22 of the second temperature-increasing chamber 20B, so that the tank container 10 is entirely and uniformly heated.

The temperature of the tank container 10 is increased at a predetermined speed with the hot air blown from the nozzle 22 of the second temperature-increasing chamber 20B and the tank container 10 is heated to a second work temperature. Therefore, the temperature of the tank container 10 is increased step-by-step from the first work temperature to the second work temperature in two stages (see the temperature-increasing process of FIG. 8).

The tank container 10 is heated to the second work temperature, and is then conveyed to the soaking chamber 20C from the second temperature-increasing chamber 20B (S107) and is rotated about the central axis thereof by the rotating device 21 in the soaking chamber 20C. Then, the high-temperature gas flowing through the intake passage 261 of the intake and exhaust box 26 is heated by the plug heater 263 of the intake and exhaust box 26 attached to the soaking chamber 20C, and the gas heated to a third gas temperature that is a temperature between the first and second gas temperatures is then blown onto the surface of the tank container 10 from the nozzle 22 of the soaking chamber 20C (S108). Since the tank container 10 is rotated about the central axis thereof by the rotating device 21, the hot air is blown onto the entire surface of the tank container 10 from the nozzle 22 of the soaking chamber 20C, so that the tank container 10 is entirely and uniformly heated. The temperature of the tank container 10 is maintained at a third work temperature with the hot air blown from the nozzle 22 of the soaking chamber 20C (soaking process). The third work temperature and the maintaining time are set in accordance with the thermal curing properties of the thermosetting resin so as to satisfy the heating conditions corresponding to the curing reactions of the thermosetting resin.

Further, after a predetermined period of time has passed, the tank container 10 is conveyed to the gradually-cooling chamber 31 of the cooling furnace 5 from the soaking chamber 20C (S109), and is rotated about the central axis thereof by the rotating device 21 in the gradually-cooling chamber 31. Since the open/close door 25B is opened when the tank container 10 is conveyed from the heat curing furnace 4 to the cooling furnace 5, and is closed when the tank container 10 is placed in the gradually-cooling chamber 31, a decrease in the temperature inside the heat curing furnace 4 can be suppressed.

The tank container 10 is placed in the gradually-cooling chamber 31, and hot air at the reference gas temperature or room-temperature air is then supplied to the nozzle 15 from the gas supplier 6 and blown onto the surface of the tank container 10 from the nozzle 15. Since the tank container 10 is rotated about the central axis thereof by the rotating device 21, the hot air at the reference gas temperature is blown onto the entire surface of the tank container 10 from the nozzle 15 of the gradually-cooling chamber 31, so that the tank container 10 is entirely, uniformly, and gradually cooled. The temperature of the tank container 10 is decreased at a predetermined speed with the hot air at the reference gas temperature or room-temperature air blown from the nozzle 15 of the gradually-cooling chamber 31 (gradually-cooling process). Then, the temperature of the tank container 10 is decreased to a fourth work temperature, and the tank container 10 is then conveyed from the gradually-cooling chamber 31 to the rapidly-cooling chamber 32 (S110). In the rapidly-cooling chamber 32, the tank container 10 is rotated about the central axis thereof by the rotating device 21.

The tank container 10 is placed in the rapidly-cooling chamber 32, and a refrigerant at a temperature lower than the reference gas temperature is then blown onto the surface of the tank container 10 from the nozzle 16 of the rapidly-cooling chamber 32. Since the tank container 10 is rotated about the central axis thereof by the rotating device 21, the low-temperature refrigerant is blown onto the entire surface of the tank container 10 from the nozzle 16 of the rapidly-cooling chamber 32, so that the tank container 10 is entirely and uniformly cooled. The tank container 10 is cooled at a predetermined speed with the low-temperature refrigerant blown from the nozzle 16 of the rapidly-cooling chamber 32 (rapidly-cooling process). The speed at which the temperature of the tank container 10 is decreased in the cooling process is set in accordance with the thermal curing properties of the thermosetting resin so as to satisfy the conditions corresponding to the curing reactions of the thermosetting resin. The speed at which the temperature of the tank container 10 is decreased is set higher in the rapidly-cooling process than in the gradually-cooling process. When the temperature of the tank container 10 has decreased to a predetermined temperature, the tank container 10 is conveyed to the outside of the cooling furnace 5 and carried out of the housing 2 through the opening 2a (S111).

In the fuel tank producing apparatus 1, the aforementioned processes are repeated, so that a plurality of tank containers 10 are continuously cured.

<Function and Effect>

In order to allow the fuel tank producing apparatus 1 to have a continuous curing furnace corresponding to complicated curing reactions of the thermosetting resin, the fuel tank producing apparatus 1 has the structure in which the heating chambers 20 are each provided with the nozzle 22 formed so as to follow the shape of the tank, the nozzle 22 capable of directly heating the tank container 10 near the tank container 10, and hot air is directly blown onto the tank container 10 in each of the heating chambers 20. Further, the intake and exhaust boxes 26 each have the built-in plug heater 263, so that feedback control of the temperature of the gas blown from the nozzle 22 is performed for each of the heating chambers 20.

Therefore, the temperatures of the heating chambers 20 are less affected by those of the adjacent heating chambers 20, so that the temperature at which the tank container 10 is heated can be precisely controlled in each of the heating chambers 20. Further, one gas supplier 6 can easily control the temperatures of the gas blown from the nozzles in the heating chambers to be different from each other. Thus, it is possible to eliminate the need to provide open/close doors between the heating chambers for differentiating the temperatures of the heating chambers from each other, reduce the production cost of the fuel tank producing apparatus 1, and simplify the structure, so that the equipment can be consolidated. Furthermore, variations in the temperature caused by opening and closing of the doors are eliminated, so that the curing quality can be stabilized.

In addition, for the furnace wall 24, the thin heat-insulating material 243 with a highly efficient heat-insulating property is used and the furnace outer wall 242 is fixed to the heat-insulating material 243 with a heat-insulating fastening component. Further, the air layer is provided between the furnace outer wall 242 and the heat-insulating material 243, and the air circulation slits 242b continuous with the air layer are provided to the furnace outer wall 242. Therefore, the furnace wall 24 can be made extremely thin without reducing the heat-insulating performance, and the equipment size can be further reduced.

The fuel tank producing apparatus 1 has the intake and exhaust box 26 including the intake passage 261 and exhaust passage 262, integrally formed with each of the heating chambers 20 of the heat curing furnace 4, and the intake and exhaust box 26 is provided with the air amount adjusting damper therein. Therefore, space saving and simplified components can be realized and the intake-exhaust balance of hot air can be adjusted so as to stabilize the temperature inside the furnace as well, so that the curing quality of the tank container 10 can be stabilized.

Although the embodiment of the present disclosure has been described in detail, the disclosure is not limited thereto, and various design changes can be made without departing from the spirit and scope of the present disclosure described in the appended claims.

DESCRIPTION OF SYMBOLS

1 Fuel tank producing apparatus
2 Housing
3 Conveyor
4 Heat curing furnace
5 Cooling furnace
6 Gas supplier
7 Gas discharger
8 Intake duct
9 Exhaust duct
10 Tank container
11 Body portion
12 Dome portion
13 Supported shaft
20 Heating chamber
20A First temperature-increasing chamber
20B Second temperature-increasing chamber
20C Soaking chamber
21 Rotating device
210 Bearing member
211 Rotating motor
22 Nozzle
221 Rectifying chamber
222 Injection port
24 Furnace wall
25A, 25B Open/close doors
26 Intake and exhaust box
261 Intake passage
262 Exhaust passage
264a, 264b Intake ports
264c Exhaust port
31 Gradually-cooling chamber
32 Rapidly-cooling chamber
L Central axis

What is claimed is:

1. A fuel tank producing apparatus for heating a tank container with fibers impregnated with a thermosetting resin wound around a surface thereof so as to thermally cure the thermosetting resin, the apparatus comprising:
   a conveyor adapted to convey the tank container;
   a plurality of heating chambers adapted to heat the tank container during conveyance;
   a cooling chamber adapted to cool the tank container at a position downstream of the plurality of heating chambers in a conveying direction of the conveyor;
   a gas supplier adapted to supply gas to the plurality of heating chambers;
   a plurality of nozzles adapted to blow the gas supplied from the gas supplier onto the surface of the tank container in the plurality of heating chambers; and
   a plurality of heaters adapted to heat the gas between the gas supplier and the plurality of nozzles.

2. The fuel tank producing apparatus according to claim 1, wherein:
   the plurality of heating chambers include a first temperature-increasing chamber, a second temperature-increasing chamber, and a soaking chamber disposed in this order from the upstream side to the downstream side in the conveying direction of the conveyor, and
   the plurality of heaters are adapted to set a temperature of the gas blown from the plurality of nozzles in the second temperature-increasing chamber, the soaking chamber, and the first temperature-increasing chamber so as to become lower in this order.

3. The fuel tank producing apparatus according to claim 1, wherein each heating chamber includes:
   an intake damper adapted to adjust an amount of gas to be supplied to each nozzle through changing an opening area of an intake port that communicates with each nozzle;
   an exhaust damper adapted to adjust an amount of gas to be discharged from each heating chamber through changing an opening area of an exhaust port opened in each heating chamber;
   a pressure measuring sensor adapted to measure a pressure in each heating chamber; and
   a control device adapted to expand the opening area of the exhaust port by controlling the exhaust damper when the pressure in each heating chamber is positive as compared to a predetermined value, and to expand the opening area of the intake port by controlling the intake damper when the pressure in each heating chamber is negative as compared to the predetermined value.

4. The fuel tank producing apparatus according to claim 1, wherein:
   the tank container includes a cylindrical body portion and dome portions provided at opposite ends of the body portion,
   each heating chamber is provided with a rotating portion adapted to rotate the tank container about the central axis of the tank container, and
   each nozzle has a first injection port adapted to blow gas onto a surface of the body portion and second injection ports adapted to blow gas onto surfaces of the dome portions from directions of the tangent to the dome portions.

\* \* \* \* \*